US 8,659,981 B2

(12) United States Patent
Oshida et al.

(10) Patent No.: US 8,659,981 B2
(45) Date of Patent: *Feb. 25, 2014

(54) MEDIA PROCESSING APPARATUS AND CONTROLLING METHOD OF THE SAME THAT PREVENTS PROCESSING OF THE MEDIA FROM BEING STOPPED

(71) Applicant: Seiko Epson Corporation, Tokyo (JP)

(72) Inventors: Kazuya Oshida, Suwa (JP); Koji Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,851

(22) Filed: Feb. 28, 2013

(65) Prior Publication Data

US 2013/0179908 A1    Jul. 11, 2013

Related U.S. Application Data

(63) Continuation of application No. 12/141,497, filed on Jun. 18, 2008, now Pat. No. 8,406,095.

(30) Foreign Application Priority Data

Jun. 18, 2007 (JP) .................................. 2007-160743
Jun. 19, 2007 (JP) .................................. 2007-160977

(51) Int. Cl.
*G11B 7/085*  (2006.01)
*G11B 17/03*  (2006.01)

(52) U.S. Cl.
USPC ...................... 369/30.36; 369/30.31; 720/606

(58) Field of Classification Search
USPC .......... 720/600, 601, 604, 605, 615, 616, 652, 720/695, 703–717; 101/40; 347/104
See application file for complete search history.

(56) References Cited

U.S. PATENT DOCUMENTS

| 4,952,996 A | 8/1990 | Nishizawa et al. |
| 5,910,939 A | 6/1999 | Shiba et al. |
| 5,940,355 A * | 8/1999 | Buckland et al. ........... 369/30.55 |
| 6,151,285 A | 11/2000 | Watanabe et al. |

(Continued)

FOREIGN PATENT DOCUMENTS

| CN | 1398402 A | 2/2003 |
| EP | 1 251 504 A2 | 10/2002 |

(Continued)

OTHER PUBLICATIONS

Extended European Search Report issued Sep. 3, 2009 for Application No. 08011044.8.

*Primary Examiner* — Nathan Danielsen
(74) *Attorney, Agent, or Firm* — Nutter McClennen & Fish LLP; John J. Penny, V.; Christopher A. Potts (57) ABSTRACT

A processor is provided in a main body and performs at least one of writing data on a plate-shaped medium, reading data from the medium and printing on the medium. A drawer tray is provided in the main body, includes a stacker portion which is configured to accommodate a plurality of plate-shaped media processed by the processor and is movable between an accommodated position where the stacker portion is capable of receiving the media and a drawn position where the drawer tray is pulled out from the main body to take out the media accommodated in the stacker portion.

9 Claims, 9 Drawing Sheets

(56) References Cited

U.S. PATENT DOCUMENTS

| | | |
|---|---|---|
| 6,321,649 B1 | 11/2001 | Vangen et al. |
| 6,400,659 B1 | 6/2002 | Kitaoka |
| 6,452,893 B1 | 9/2002 | Wahl |
| 6,490,232 B2 | 12/2002 | Sato |
| 6,633,518 B1 | 10/2003 | Minote |
| 6,848,113 B2 | 1/2005 | Klein |
| 7,020,884 B2 | 3/2006 | Choi et al. |
| 7,305,683 B2 | 12/2007 | Namiki |
| 7,367,034 B2 | 4/2008 | Hara |
| 7,961,563 B2 | 6/2011 | Nishioka et al. |
| 2003/0011286 A1 | 1/2003 | Weisser et al. |
| 2006/0136940 A1 | 6/2006 | Nishide et al. |
| 2007/0280057 A1 | 12/2007 | Ikeda |
| 2008/0036844 A1 | 2/2008 | Hagstrom |
| 2008/0310940 A1 | 12/2008 | Yamada et al. |
| 2008/0313663 A1 | 12/2008 | Oshida et al. |

FOREIGN PATENT DOCUMENTS

| | | |
|---|---|---|
| EP | 1 909 476 A2 | 4/2008 |
| JP | 02-001694 A | 1/1990 |
| JP | 05-189862 A | 7/1993 |
| JP | 07-254202 A | 10/1995 |
| JP | 07-272374 A | 10/1995 |
| JP | 11-066669 A | 3/1999 |
| JP | 2000-260172 A | 9/2000 |
| JP | 2001-283498 A | 10/2001 |
| JP | 2002-237104 A | 8/2002 |
| JP | 2002-352501 A | 12/2002 |
| JP | 2003-187511 A | 7/2003 |
| JP | 2005-025888 A | 1/2005 |
| JP | 2005-178267 A | 7/2005 |
| JP | 2005-222590 A | 8/2005 |
| JP | 2005-259230 A | 9/2005 |
| JP | 2006-103236 A | 4/2006 |
| JP | 2006-127658 A | 5/2006 |
| JP | 2006-179115 A | 7/2006 |
| JP | 2006-202379 A | 8/2006 |
| JP | 2006-331534 A | 12/2006 |
| JP | 2009-059469 A | 3/2009 |
| WO | 2006/132094 A1 | 12/2006 |

* cited by examiner

MEDIA PROCESSING APPARATUS AND CONTROLLING METHOD OF THE SAME THAT PREVENTS PROCESSING OF THE MEDIA FROM BEING STOPPED

Priority is claimed under 35 U.S.C. §119 to Japanese Patent Application No. 2007-160943, filed on Jun. 18, 2007, Japanese Patent Application No. 2007-160977, filed on Jun. 19, 2007 and to U.S. application Ser. No. 12/141,497, filed on Jun. 18, 2008, which are hereby incorporated by reference in their entireties.

BACKGROUND

The present invention relates to a media processing apparatus that performs a predetermined process on media, such as CDs and DVDs, and a controlling method of the same.

In recent years, disc dubbing apparatuses that write data on a plurality of media (information recording media), such as blank CDs (compact discs) or DVDs (digital versatile discs), and media processing apparatuses, such as CD/DVD publishers, that perform a data writing process and a label printing process to create media and publish the media have been used. As this type of media processing apparatus, an apparatus has been proposed which includes a drive that writes data on a medium, a printer that performs printing on a label surface of the medium, and a media transfer mechanism that holds the medium and transfers it to the driver and the printer (for example, see Patent Document 1).

Patent Document 1: Japanese Patent Publication No. 2006-202379A

In such a media processing apparatus, a door that is opened or closed when a plurality of media are loaded or taken out is provided so as to close up an opening portion. However, when the door is opened during a process, a user is likely to touch the medium being processed, which results in errors in the process. Therefore, when the door is opened during a process, the process stops. For example, when the processed media are sequentially taken out, it is necessary to open the door whenever each medium is completely processed. Therefore, the process stops once whenever the door is opened. As a result, it requires a long time to process all, the media.

For this reason, the following structure has been proposed: a media outlet is provided so as to be exposed to the outside, and a media transfer mechanism drops the processed media, which cannot be accommodated in an internal stacker, in the vicinity of the media outlet such that the processed media slide on an inclined plane to be discharged from the media outlet. According to this structure, it is possible to sequentially take out the processed media without opening the door to stop the process.

However, as described above, when the media slide on the inclined plane to be transferred to the media outlet, data recording the surfaces of the media are likely to be damaged due to contact with the inclined plane, or the processed medium is likely to obliquely collide with the medium that has been previously discharged to damage a printing surface of the media.

SUMMARY

An object of the invention is to provide a media processing apparatus capable of sequentially taking out processed media with high quality, without opening the door, and a controlling method of the same.

In order to achieve the object, according to an aspect of the invention, media processing apparatus comprising: a main body; a processor which is provided in the main body and performs at least one of writing data on a plate-shaped medium, reading data from the medium and printing on the medium; and a drawer tray provided in the main body, including a stacker portion which is configured to accommodate a plurality of plate-shaped media processed by the processor, and movable between an accommodated position where the stacker portion is capable of receiving the media and a drawn position where the drawer tray is pulled out from the main body to take out the media accommodated in the stacker portion.

According to the media processing apparatus having the above-mentioned structure, the drawer tray is moved to the accommodated position, and the media are accommodated in the stacker portion inside the main body. Then, the drawer tray is pulled out to sequentially take out the media. In this structure, when receiving the media, the stacker portion is positioned inside the apparatus. Therefore, it is not necessary to slide the media on the inclined plane, and thus it is possible to discharge the medium without any damage. Further, when receiving the media, the stacker portion is positioned inside the apparatus. Therefore, there are no restrictions in an installation position and the periphery thereof, unlike the structure in which a separate stacker is arranged in the outside. As a result, it is possible to improve flexibility in installation.

The main body may be provided with an opening for exposing the processor to the outside and a door which is configured to open and close the opening and the drawer tray may be movable between the accommodated position and the drawn position while the door is closed.

According to this structure, since the drawer tray can be moved to the drawn position while the door is closed, it is possible to sequentially take out the media without opening the door, which results in high operability.

Further, since it is possible to take out the media without opening the door, it is possible to prevent the user from touching the medium being processed with a hand. As a result, it is possible to improve the process reliability of media.

The media processing apparatus may further comprise: a tray accommodation sensor that detects whether the drawer tray is positioned at the accommodated position; and a control unit that stops a media discharge process of discharging the medium into the drawer tray and continues processes for the media other than the media discharge process when the tray accommodation sensor detects that the drawer tray is moved from the accommodated position.

According to the above-mentioned structure, the tray accommodation sensor can detect the drawer tray at the accommodated position capable of receiving media. Therefore, when the drawer tray is moved from the accommodated position, the media discharge process of discharging a medium to the drawer tray is stopped. During processes other than the media discharge process, it is possible to continuously perform the process. As a result, it is possible to take out media without lowering the performance of a processing apparatus.

The media processing apparatus may further comprise a warning unit that issues an alarm while performing the media discharge process such that a user does not move the drawer tray from the accommodated position.

According to the above-mentioned structure, since the alarm is issued during the media discharge process of discharging the medium to the drawer tray, it is possible to warn the user to stop the opening of the drawer tray, in order to prevent the process from being stopped.

A movable area of the drawer tray is out of a movable area of the door. According to this structure, the drawer tray can be opened at any time, regardless of the opening or closing of the door. Therefore, it is possible to improve user convenience, as compared to, for example, the structure in which the drawer tray is movable only when the door is fully opened or closed.

According to another aspect of the invention, there is provided a controlling method of a media processing apparatus including a main body, a processor which is provided in the main body and performs at least one of writing data on a plate-shaped medium, reading data from the medium and printing on the medium, a drawer tray provided in the main body, configured to accommodate a plurality of plate-shaped media processed by the processor, and movable between an accommodated position and a drawn position, and a tray accommodation sensor that detects whether the drawer tray is positioned at the accommodated position, the controlling method comprising: when the tray accommodation sensor detects that the drawer tray is moved from the accommodated position during a media discharge operation of discharging the medium to the drawer tray, stopping the media discharge operation; when the tray accommodation sensor detects that the drawer tray is moved from the accommodated position during operations other than the media discharge operation, continuing the operation.

According to the above-mentioned control method, in conditions other than when a medium is discharged to the drawer tray, even when the drawer tray is opened during the process of the medium, it is possible to continuously perform the process on the media. That is, during operations other then the operation of discharging the medium to the drawer tray, it is possible to sequentially take out the media while continuously performing the process.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, a media processing apparatus and a controlling method of the same according to embodiments of the invention will be described with reference to the accompanying drawings.

Further, in the following embodiments, a publisher is used as an example of a media processing apparatus.

Figure 1:
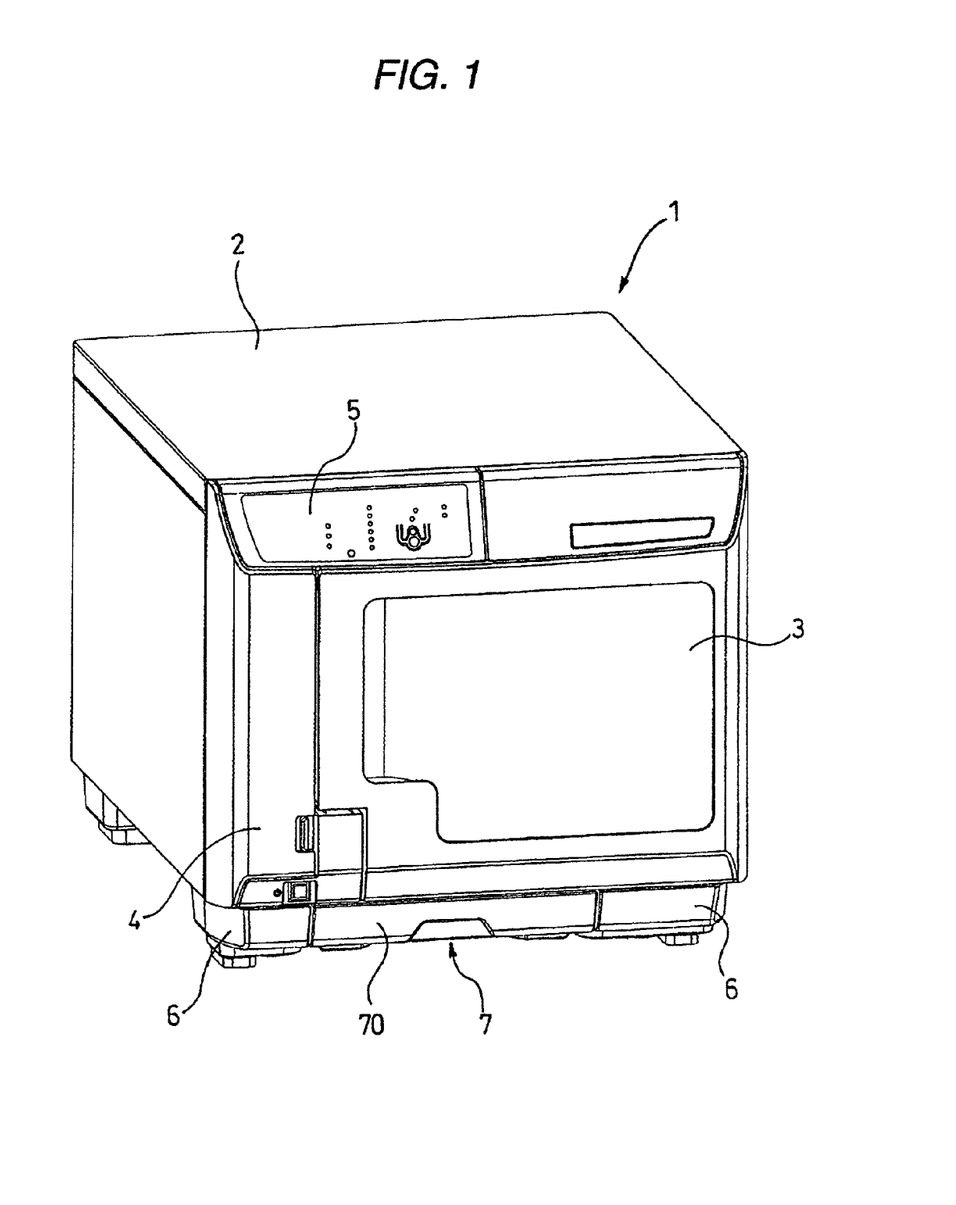
FIG. 1 is a perspective view illustrating the appearance of a publisher (media processing apparatus) according to an embodiment of the invention.
Figure 2:
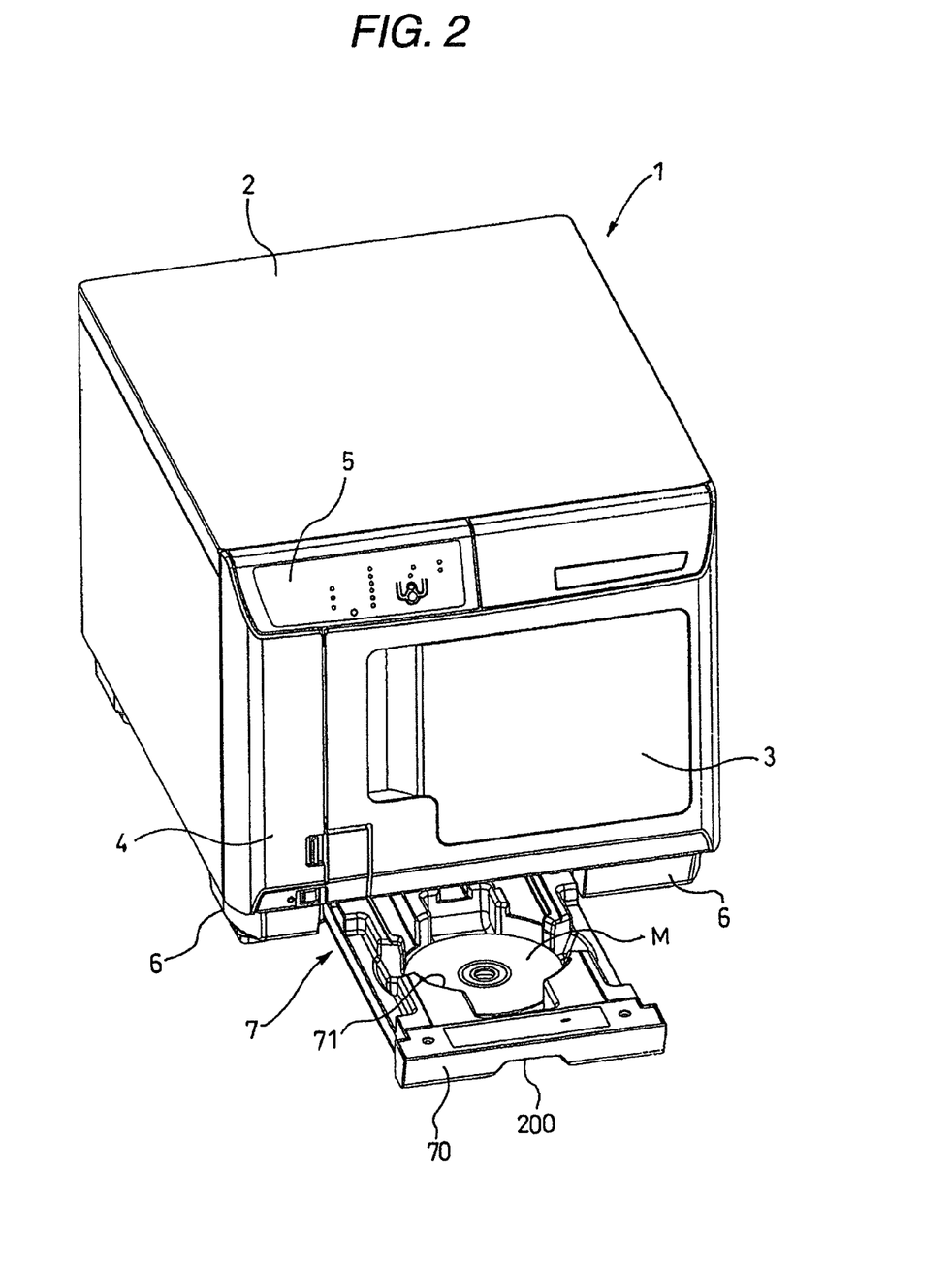
FIG. 2 is a perspective view illustrating the publisher with a drawer tray being opened.
Figure 3:
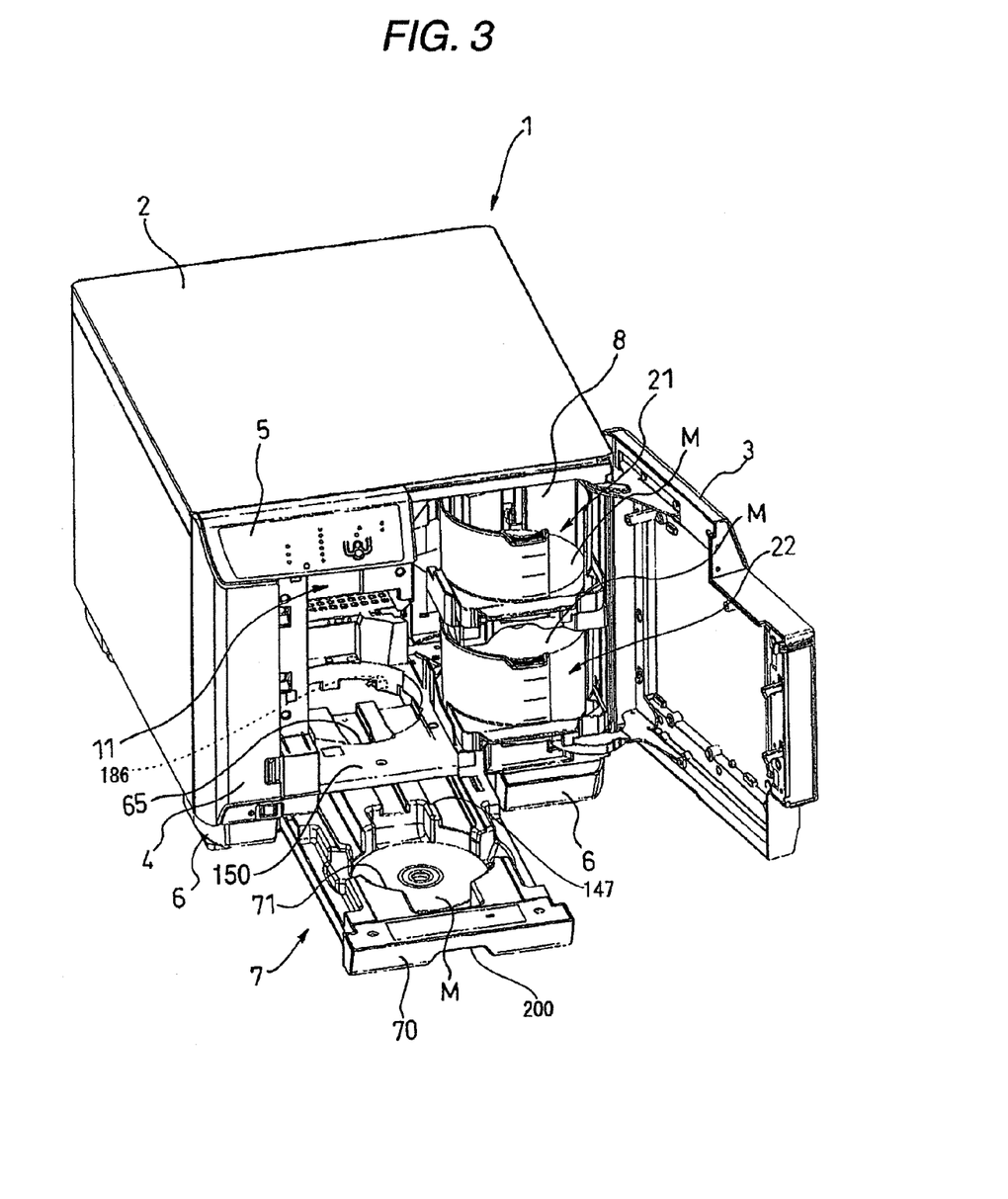
FIG. 3 is a perspective view illustrating the appearance of the publisher with each component being opened.
Figure 4:
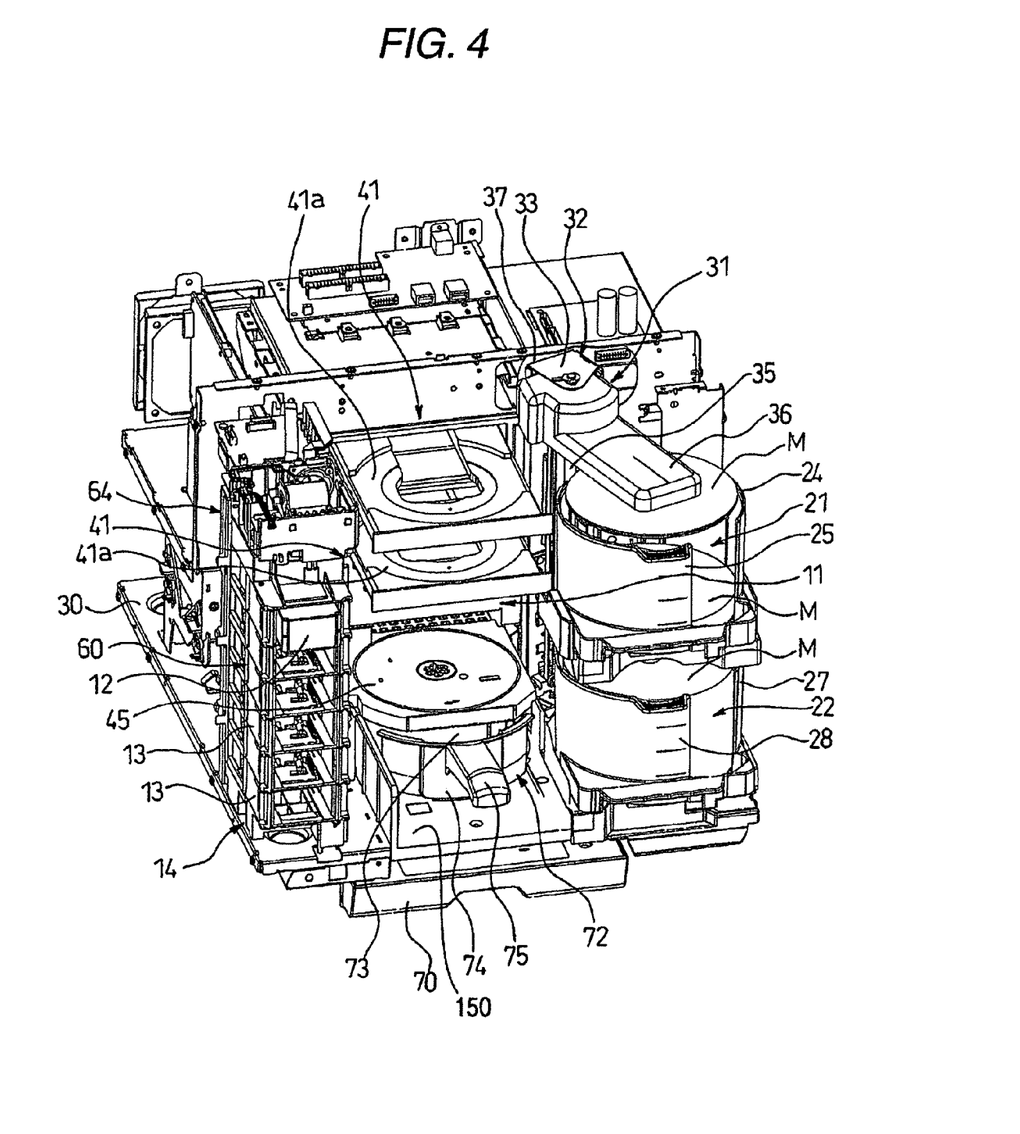
FIG. 4 is a perspective view illustrating the publisher with a case being removed, as viewed from an upper front side.
Figure 5:
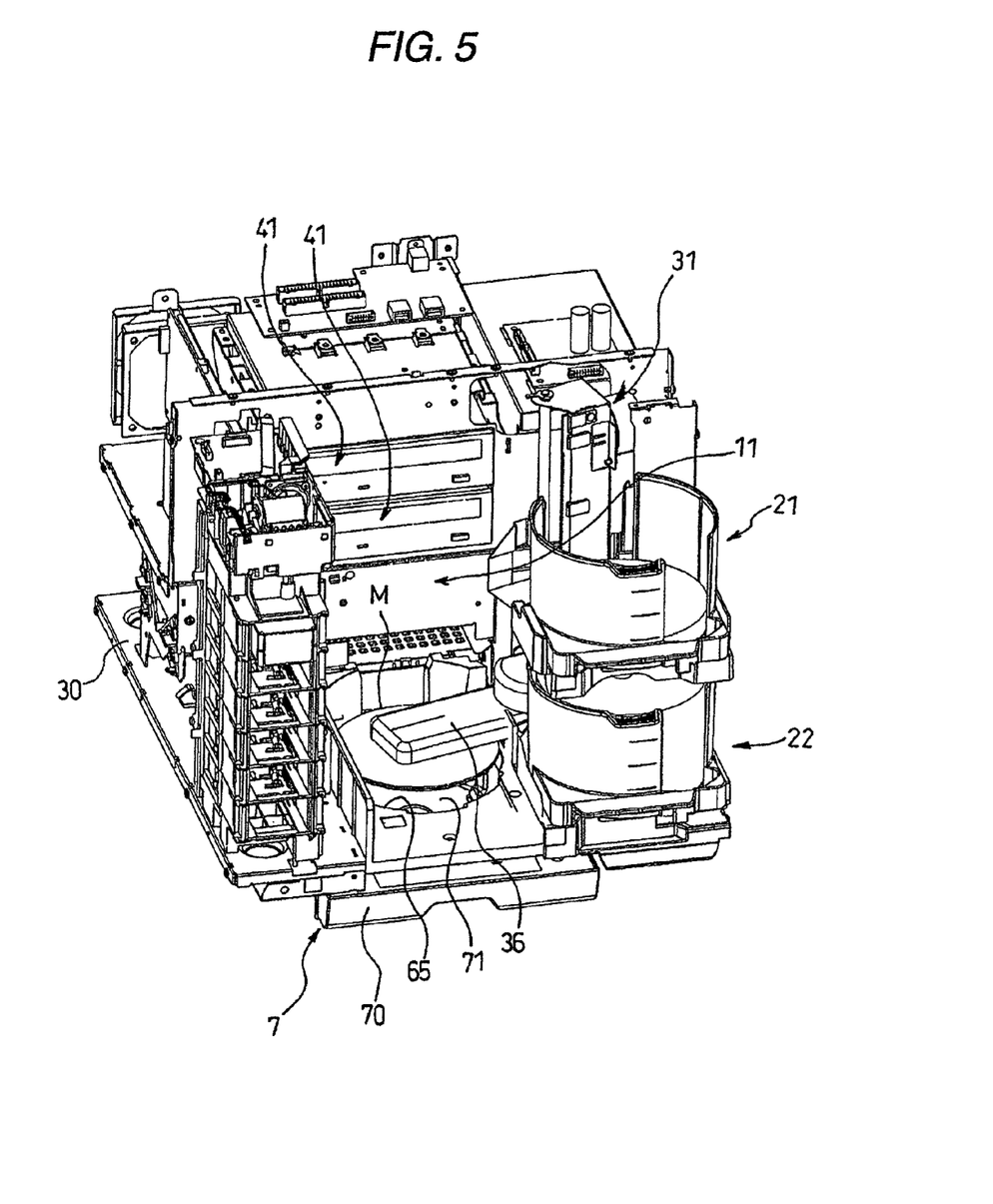
FIG. 5 is a perspective view illustrating the publisher with the case being removed, as viewed from the upper front side.
Figure 6:
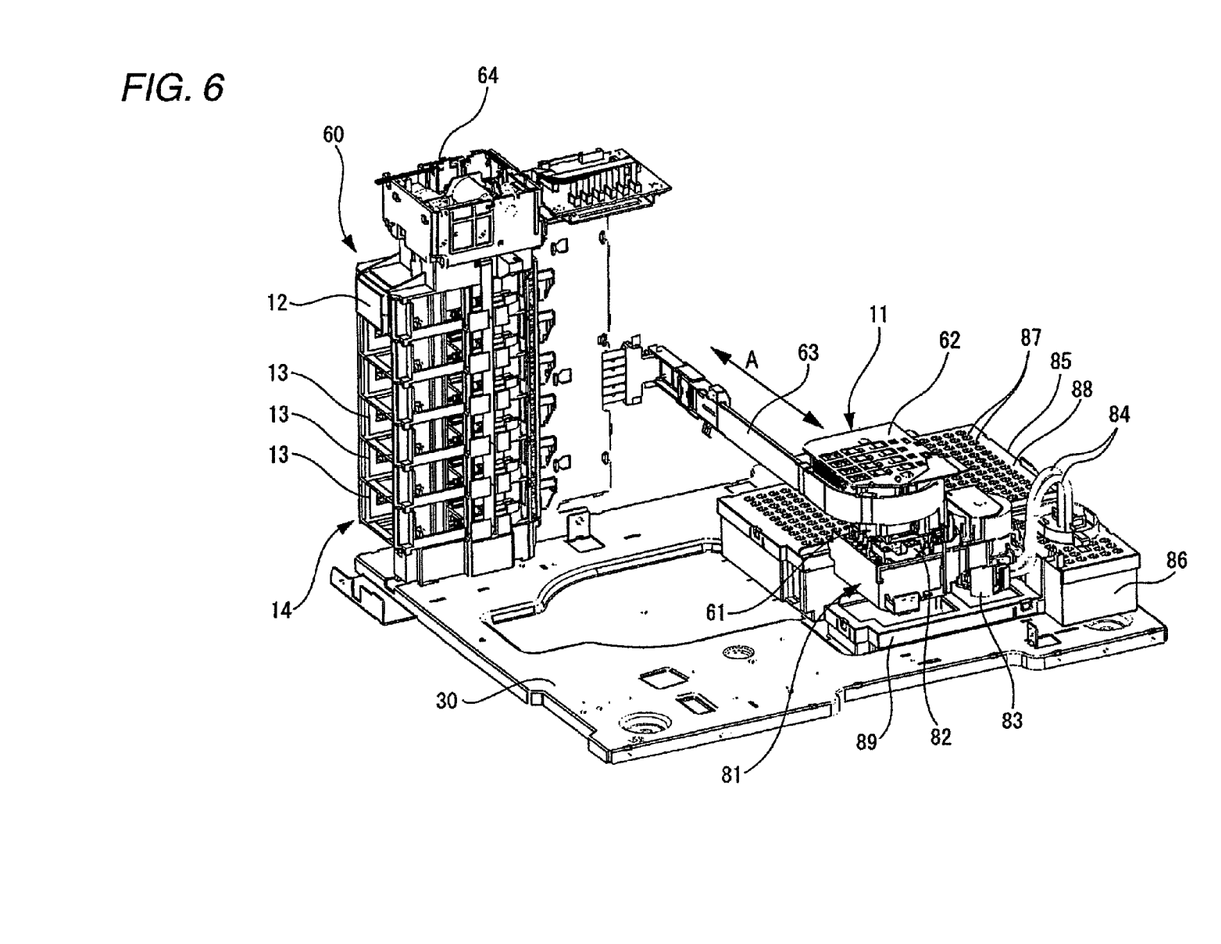
FIG. 6 is a perspective view illustrating a label printer provided in the publisher.
Figure 7:
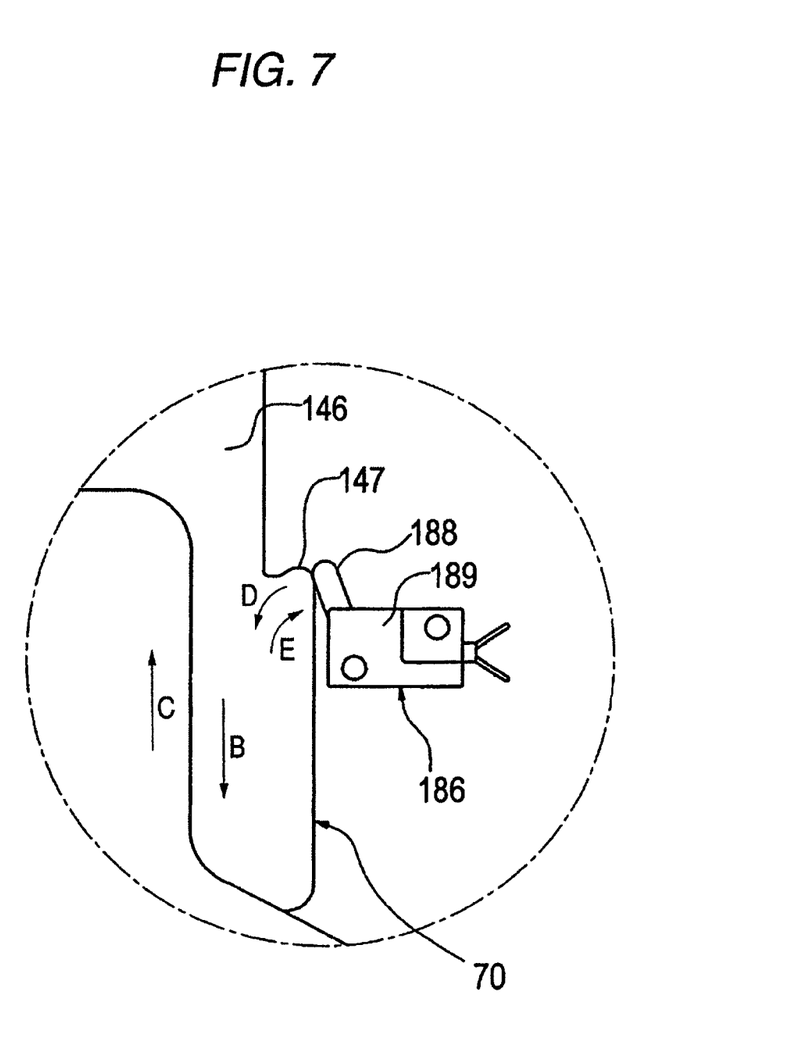
FIG. 7 is a partial enlarged view illustrating the operation of a tray accommodation sensor provided in the publisher.
Figure 8:
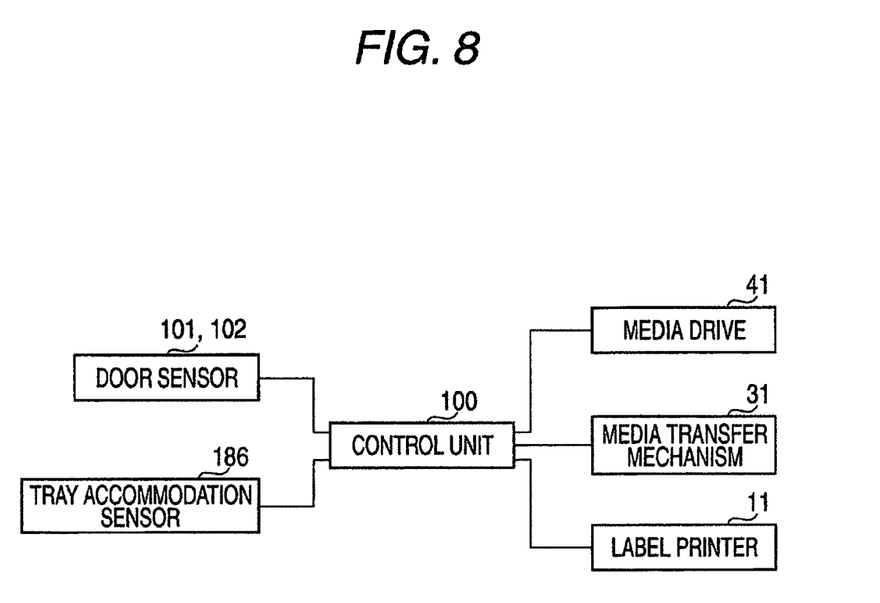
FIG. 8 is a block diagram schematically illustrating a control system of the publisher.

FIG. 1 is a perspective view illustrating the appearance of a publisher (media processing apparatus) with each component being closed. FIG. 2 is a perspective view illustrating the appearance of the publisher with a drawer tray being pulled out. FIG. 3 is a perspective view illustrating the appearance of the publisher with each component being opened. FIG. 4 is a perspective view illustrating the publisher with a case being removed, as viewed from an upper front side. FIG. 5 is a perspective view illustrating the publisher with the case being removed, as viewed from an upper left side. FIG. 6 is a perspective view illustrating a label printer provided in the publisher. FIG. 7 is a partial enlarged view illustrating the operation of a tray accommodation sensor provided in the publisher. FIG. 8 is a block diagram schematically illustrating a control system of the publisher.

As shown in FIGS. 1 and 2, a publisher 1 is a media processing apparatus that has a function of writing and/or reading data on and/or from disk media, such as CDs or DVDs, and a function of performing printing on the label surfaces of the media, and includes a substantially rectangular case 2. Openable doors 3 and 4 are hinged to the right and left sides of a front surface of the case 2. A control panel 5 having, for example, display lamps and operating buttons arranged thereon is provided at an upper left side of the case 2, and mounting legs 6 are provided at the right and left sides of a lower part of the case 2 so as to protrude from the bottom of the case. A drawing mechanism 7 is provided between the left and right legs 6.

As shown in FIG. 3, the right door 3, as viewed from the front side, closes up an opening 8 that is provided in the front surface of the publisher 1. For example, the door 3 is opened to set a blank medium M through the opening 8, or to take out a written medium M through the opening 8.

The left door 4, as viewed from the front side, is opened or closed to replace an ink cartridge 12 of the label printer 11 shown in FIG. 4. When the door 4 is opened, a cartridge mounting portion 14 having a plurality of cartridge holders 13 arranged in the vertical direction is exposed.

A media stacker 21, which serves as a media storage that can stack a plurality of blank media M (for example, 50 media) that are not subjected to a data writing process, and a media stacker 22, which serves as a media storage that stores a plurality of blank media M or written media M (for example 50 media), are arranged in the vertical direction inside the case 2 of the publisher 1 such that the media M stored in the media stackers are coaxial. The media stacker 21 and the media stacker 22 are detachably provided from their own positions.

The upper media stacker 21 includes a pair of left and right arc-shaped casing boards 24 and 25. In this way, the upper media stacker receives the media M from the upper side and can coaxially stack the media M. It is possible to easily insert or supply the media M to the media stacker 21 by opening the door 3 and taking out the media stacker 21.

The lower media stacker 22 has the same structure as the upper media stacker. That is, the lower media stacker 22 includes a pair of left and right arc-shaped casing boards 27 and 28. In this way, the lower media stacker receives the media M from the upper side and can coaxially stack the media M.

A media transfer mechanism 31 is provided at the rear side of the media stacker 21 and the media stacker 22. The media transfer mechanism 31 includes a vertical guide shaft 35 that is vertically provided between a body frame 30 and a top board 33 of a chassis 32. A transfer arm 36 is supported by the vertical guide shaft 35 such that it is rotatable and movable in the vertical direction. The transfer arm 36 is movable up and down along the vertical guide shaft 35, and is rotatable on the vertical guide shaft 35 in the left and right directions by a driving motor 37.

Two media drives (processors) 41 that are stacked in the vertical direction are arranged on one side of the rear of the upper and lower media stackers 21 and 22 and the media transfer mechanism 31, and a carriage 62, which will be described below, of the label printer (processor) 11 is movably arranged below the media drives 41.

Each of the media drives 41 includes a media tray 41a that can move between a data write position where data is written on the medium M and a media delivery position where the medium M is loaded or taken out.

The label printer 11 includes a media tray 45 that is movable between a printing position where a label can be printed on a label surface of the medium M and a media delivery position where the medium M is loaded or taken out.

FIG. 4 shows the media trays 41a of the upper and lower media drives 41 that are drawn forward to be disposed at the media delivery positions and the media tray 45 of the label printer 11 below the media drives that is drawn forward to be disposed at the media delivery position. The label printer 11 is an ink jet printer, and various color (in this embodiment, six colors of black, cyan, magenta, yellow, light cyan, and light magenta) ink cartridges 12 are used as an ink supply mechanism 60. These ink cartridges 12 are mounted to the cartridge holders 13 of the cartridge mounting portion 14 from the front side.

Gaps in which the transfer arm 36 of the media transfer mechanism 31 is movable up and down are formed between the pair of left and right casing boards 24 and 25 of the media stacker 21 and between the pair of left and right casing boards 27 and 28 of the media stacker 22. In addition, a gap is formed between the upper media stacker 21 and the lower media stacker 22 such that the transfer arm 36 of the media transfer mechanism 31 can rotate in the horizontal direction to be positioned immediately above the media stacker 22. When the two media trays 41a are pushed into the media drives 41, the transfer arm 36 of the media transfer mechanism 31 is moved down to access the media tray 45 at the media delivery position. FIG. 4 is a diagram illustrating the media trays 41a of the media drives 41 and the media tray 45 positioned at the media delivery positions. In FIG. 4, one of the three trays is moved to the delivery position such that a medium can be loaded or taken out.

As shown in FIG. 5, the transfer arm 36 of the media transfer mechanism 31 can be moved down below the media tray 45, with the two media trays 41a positioned at the data write position and the media tray 45 positioned at the printing position. In addition, a guide hole 65 for mounting a media stacker (separate stacker), which will be described below, is formed below the media delivery position of the media tray 45, through which the medium M passes through when the transfer arm 36 is moved down to release the medium M. The guide hole 65 is provided in a guide member 150 that is fixed to the body frame 30.

The drawing mechanism 7 includes a drawer tray 70 that is provided below the body frame 30. The drawer tray 70 can be pulled out from an accommodation portion that is formed by a concave frame (not shown) made of a steel plate, which is fixed to a lower part of the body frame 30, to be open, or it can be pushed into the accommodation portion to be close. As shown in FIGS. 1 and 2, the drawer tray 70 is provided at a position deviating from a rotation trajectory, which is the movement range of the doors 3 and 4, such that it can be opened at any time, regardless of the opening or closing of the doors 3 and 4. A concave stacker portion 71 is provided in the lower part of the drawer tray 70 so as to accommodate the medium M. When the drawer tray 70 is at an accommodated position (closed position), the stacker portion 71 is positioned below the guide hole 65 such that the center of the stacker portion 71 is coaxial with the two media trays 41a and the media tray 45 at the delivery positions. As shown in FIG. 5, the stacker portion 71 receives the media M supplied through the guide hole 65, and accommodates a relatively small number of media M (for example, about 5 to 10 media). The stacker portion 71 receives the media M from the upper side, and can store the media M that are coaxially stacked.

In addition, when taking out the media M accommodated in the stacker portion 71, an operator holds a grip portion 200 (see FIGS. 2 and 3) provided on the front side of the drawer tray 70 with a hand and pulls out the drawer tray 70 from the body frame 30.

Further, a tray accommodation sensor 186 that detects the drawer tray 70 at the accommodated position is provided on the rear side of the guide hole 65 (see FIG. 3). The tray accommodation sensor 186 will be described in detail with reference to FIG. 7. The tray accommodation sensor 186 includes a lever 188 that protrudes to the movement range of a step portion 147 of the drawer tray 70 and can be tilted in the directions of arrows D and E, and a sensor body 189 that detects the tilt of the lever 188.

As shown in FIG. 7, when the drawer tray 70 is at the accommodated position, the tray accommodation sensor 186 comes into contact with the step portion 147 of the drawer tray 70 and is then turned on. When the drawer tray 70 is drawn from the accommodated position in the direction of arrow B, the lever 188 is separated from the step portion 147 and then tilted in the direction of the arrow E. Then, the tray accommodation sensor 186 is turned off. Thereafter, when the drawer tray 70 is moved in the direction of an arrow C, the step portion 147 pushes the lever 188 to be tilted in the direction of the arrow E, and the tray accommodation sensor 186 is turned on to detect the drawer tray 70 at the accommodated position. That is, the tray accommodation sensor 186 detects whether the drawer tray 70 is at the accommodated position (closed position) with respect to the guide hole 65 or at a drawn position (opened position) with respect to the guide hole 65, and outputs the detection result to a control unit 100.

A media stacker (separate stacker) 72 that can accommodate a larger number of media M than the stacker portion 71 is detachably provided in the guide hole 65 and the stacker portion 71 of the drawer tray 70 in the accommodated state (see FIG. 4). The media stacker 72 is set above the guide hole 65 provided in the body frame 30. Therefore, it is difficult to draw out the drawer tray 70 with the media stacker 72 being mounted. A guide member 150 having the guide hole 65 provided therein is provided with a mounting sensor (not shown) that has a detection terminal that is movable in the vertical direction and detects the presence of the media stacker 72. That is, when the media stacker 72 is mounted, the detection terminal is dropped below the media stacker 72 and the mounting sensor is turned on, thereby detecting the mounting of the media stacker 72.

The media stacker 72 also includes a pair of arc-shaped casing boards 73 and 74. In this way, the media stacker 72 can receive the media M from the upper side and accommodate a plurality of media (for example, 50 media) that are coaxially stacked. Gaps are formed between the pair of arc-shaped casing boards 73 and 74 to allow the transfer arm 36 of the media transfer mechanism 31 to be movable up and down. In addition, a grip 75 that is held by a user when the media stacker is detached is provided in an upper part of the casing board 74.

When the media stacker 72 is mounted, a blank medium M is taken out from the upper media stacker 21, data is written on the medium M by the media tray 41, and a label is printed on the medium M by the label printer 11. Then, the medium M is accommodated in the media stacker 72.

For example, a maximum number of blank media M (50 media+50 media) are loaded to the upper media stacker 21 and the lower media stacker 22, and all the media M (50 media) in the lower media stacker 22 are sequentially processed and then accommodated in the media stacker 72. Then, all the media M (50 media) in the upper media stacker 21 are sequentially processed and then accommodated in the empty lower media stacker 22. In this way, the maximum number of media (50 media+50 media) in the upper media stacker 21 and the lower media stacker 22 are collectively processed (batch process mode).

When the media stacker 72 is in a detached state, a blank medium M is taken out from the upper media stacker 21 or the lower media stacker 22, and data writing and printing are performed on the blank medium M by the media drive 41 and the label printer 11, respectively. Then, the processed medium is stored in the stacker portion 71 of the drawer tray 70 in an accommodated state.

In this way, it is possible to take out the processed media M from the stacker portion 71 by pulling out the drawer tray 70. That is, it is possible to take out the processed media M one by one or several by several, with the door 3 being closed, even though the media M are being processed (external discharge mode).

The media M are appropriately transferred among the media stacker 21, the media stacker 22, the stacker portion 71 (or the media stacker 72) of the drawer tray 70, the media trays 41a of the media drives 41, and the media tray 45 of the label printer 11, by a combination of the movement of the transfer arm 36 of the media transfer mechanism 31 in the vertical direction and the rotation thereof in the horizontal direction.

As shown in FIG. 6, the label printer 11 includes a carriage 62 having an ink jet head 61 that is provided with ink discharge nozzles (not shown), and the carriage 62 is reciprocated along a carriage guide shaft (not shown) in the direction of an arrow A by a driving force of a carriage motor (not shown).

The label printer 11 includes the ink supply mechanism 60 having the cartridge mounting portion 14 to which the ink cartridges 12 are mounted. The ink supply mechanism 60 has a vertical structure, and is vertically arranged on the body frame 30 of the publisher 1. The ink supply mechanism 60 is connected to one end of a flexible ink supply tube 63, and the other end of the ink supply tube 63 is connected to the carriage 62.

Ink contained in the ink cartridge 12 mounted to the ink supply mechanism 60 is supplied to the carriage 62 through the ink supply tube 63. Then, the ink is supplied to the ink jet head 61 through a damper unit and a back pressure control unit (not shown) provided in the carriage 62 and then discharged from ink nozzles (not shown).

In addition, a pressure mechanism 64 is provided at an upper part of the ink supply mechanism 60. The pressure mechanism 64 blows compressed air to apply pressure to the ink cartridge 12, thereby discharging ink stored in an ink tank pack of the cartridge 12.

Further, a head maintenance mechanism 81 is provided below the home position (the position shown in FIG. 6) of the carriage 62.

The head maintenance mechanism 81 includes: a head cap 82 that covers the ink nozzles of the ink jet head 61 that is exposed from the lower surface of the carriage 62 arranged at the home position; and a waste ink suction pump 83 that sucks ink which is discharged to the head cap 82 by a head cleaning operation or an ink supply operation of the ink jet head 61.

The ink sucked by the waste ink suction pump 83 of the head maintenance mechanism 81 is transferred to a waste ink suction tank 85 through the tube 84.

The waste ink suction tank 85 includes a case 86 and an absorber (not shown) provided in the case 86, and the upper surface of the waste ink suction tank is covered with a cover 88 having a plurality of vent holes 87 formed therein.

In addition, a waste ink receiving portion 89, which is a part of the waste ink suction tank 85, is provided below the head maintenance mechanism 81 to receive ink dropped from the head maintenance mechanism 81, and an absorber absorbs the ink.

As shown in FIG. 8, door sensors 101 and 102 that detect the opening or closing of the doors 3 and 4 and the tray accommodation sensor 186 that detects the drawer tray 70 at the accommodated position are connected to the control unit 100 for controlling the publisher 1. The control unit 100 controls the operations of the label printer 11, the media transfer mechanism 31, and the media drives 41, on the basis of detection signals from the door sensors 101 and 102 and the tray accommodation sensor 186.

Next, the control operation of the control unit 100 based on the opening or closing states of the doors 3 and 4 and the drawer tray 70 will be described.

Figure 9:
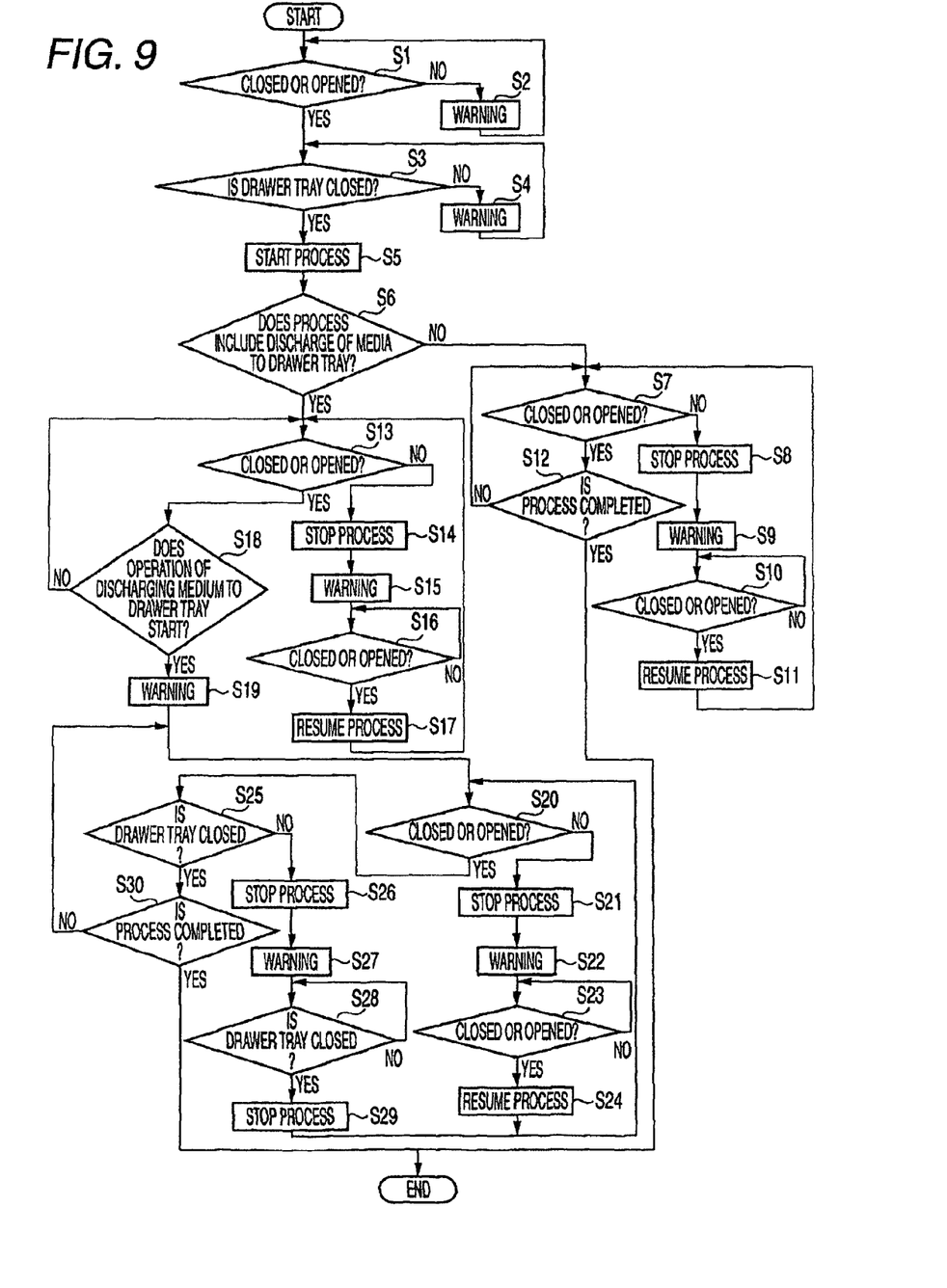
FIG. 9 is a flowchart illustrating a process of controlling the publisher.

FIG. 9 is a flowchart illustrating the control operation of the control unit 100 based on the opening or closing state of the doors 3 and 4 and the drawer tray 70 while performing printing each medium M.

First, the control unit 100 starts a control process to determine whether the doors 3 and 4 are opened or closed, on the basis of the detection signals from the door sensors 101 and 102 (Step S1). When it is determined that either of the doors 3 and 4 is opened, the control unit issues an alarm (Step S2).

For the alarm, for example, among the display lamps on the control panel 5, display lamps corresponding to the doors 3 and 4 are turned on or off, a buzzer is turned on, a sound "Please close the door" is output, or an alarm message is displayed on an application screen of a personal computer (hereinafter, referred to as a PC) (not shown) connected to the publisher 1 together with an alarm sound to prompt to the user to close the doors 3 and 4. Alternatively, both the alarm through the display lamps on the control panel 5 and the alarm displayed on the application screen may be used. In addition, instead of the display lamps, a display panel may be used to display an alarm message.

When it is determined that both the doors 3 and 4 are closed (Step S1), the control unit determines whether the drawer tray 70 is opened or closed on the basis of detection signals from the tray accommodation sensor 186 (Step S3). When it is determined that the drawer tray 70 is opened, the control unit issues an alarm (Step S4).

For the alarm, for example, among the display lamps on the control panel 5, a display lamp corresponding to the drawer tray 70 is turned on or off, a buzzer is turned on, a sound "Please close the drawer" is output, or an alarm message is displayed on an application screen of a personal computer connected to the publisher 1 together with an alarm sound to prompt to the user to close the drawer tray 70. Alternatively, both the alarm through the display lamp on the control panel 5 and the alarm displayed on the application screen of the PC may be used. In addition, instead of the display lamp, a display panel may be used to display an alarm message.

When it is determined that the drawer tray 70 is closed (Step S3), a process selected by the PC is performed on the medium M (Step S5). Specifically, the control unit operates the transfer arm 36 of the media transfer mechanism 31 stopped at a standby position to take out a blank medium M from the media stacker 21 and to transfer the medium to the media drive 41. The control unit controls the media drive 41 to write data on the medium M, and controls the transfer arm 36 to take out the medium M from the media drive 41 and to transfer the medium M to the label printer 11. Then, the control unit controls the label printer 11 to perform printing on the medium M, and controls the transfer arm 36 to take out the medium M from the label printer 11 and to transfer the medium M to the media stacker 22 or the stacker portion 71 of the drawer tray 70 in the accommodated state. Then, the control unit stops the transfer arm 36 at the standby position, and ends the process.

When the above-mentioned process is performed on the medium M (Step S5), the control unit determines whether this process includes a process of discharging the medium M to the drawer tray 70 (Step S6). For example, when a process of transferring the medium M subjected to label printing by the label printer 11 to the media stacker 22 is performed, it is determined that this process is not included in a process of discharging the medium to the drawer tray 70. Meanwhile, when a process of transferring the medium M subjected to label printing by the label printer 11 to the stacker portion 71 of the drawer tray 70 in the accommodated state is performed, it is determined that the process includes a process of discharging the medium to the drawer tray 70.

When it is determined that the process of discharging the medium to the drawer tray 70 is not included (Step S6), the control unit determines whether the doors 3 and 4 are opened or closed, on the basis of detection signals from the door sensors 101 and 102 (Step S7). When it is determined that either of the doors 3 and 4 is opened, the control unit stops the process once (Step S8), and issues the above-mentioned alarm related to the opening of the doors 3 and 4 (Step S9).

Then, the control unit waits until both the doors 3 and 4 are closed, on the basis of detection signals from the door sensors 101 and 102 (Step S10). When the doors 3 and 4 are all closed, the control unit resumes the process (Step S11).

When it is determined that the doors 3 and 4 are all closed (Step S7), the control unit determines whether the process is completely performed on the medium M (Step S12). For example, when the transfer arm 36 transfers the medium M subjected to label printing by the label printer 11 to the media stacker 22 and then stops at the standby position, the control unit determines that the process is completely performed on the medium. When it is determined that the process is completely performed on the medium M, the control unit ends the control process for the medium M, and starts the control process for the next medium M.

When it is determined that the process for the medium M includes a process of discharging the medium M to the drawer tray 70 (Step S6), the control unit determines whether the doors 3 and 4 are opened, on the basis of detection signals from the door sensors 101 and 102 (Step S13). When it is determined that either of the doors 3 and 4 is opened, the control unit stops the process once (Step S14), and issues the above-mentioned alarm related to the doors 3 and 4 (Step S15).

Then, the control unit waits until both the doors 3 and 4 are closed, on the basis of detection signals from the door sensors 101 and 102 (Step S16). When the doors 3 and 4 are all closed, the control unit resumes the process (Step S17).

When it is determined that the doors 3 and 4 are all closed (Step S13), the control unit determines whether the transfer arm 36 starts to discharge the medium M to the drawer tray 70 (Step S18).

For example, while the transfer arm 36 at the standby state starts its operation to take out the printed medium M from the media tray 45 at the media delivery position, the control unit determines that the operation of the transfer arm 36 to discharge the medium M to the drawer tray 70 does not start. On the other hand, while the transfer arm 36 takes out the printed medium M from the media tray 45 at the media delivery position and is then moved to a media release position to release the medium M to the stacker portion 71 of the drawer tray 70, the control unit determines that the operation of the transfer arm 36 to discharge the medium M to the drawer tray 70 starts and the transfer arm 36 is performing a media discharge operation.

When it is determined that the operation of the transfer arm 36 to discharge the medium. M to the drawer tray 70 starts (Step S18), the control unit issues an alarm (Step S19) to notify the user that the media discharge operation is being performed. For the alarm, for example, among the display lamps on the control panel 5, a display lamp corresponding to the drawer tray 70 is turned on or off to notify the user that the drawer should not be drawn out, or a message "Media is being discharged. Please do not open the drawer" may be displayed.

The control unit determines whether the doors 3 and 4 are opened or closed on the basis of detection signals from the door sensors 101 and 102 (Step S20). When it is determined that either of the doors 3 and 4 is opened, the control unit stops the operation of the transfer arm 36 to discharge the medium M to the drawer tray 70 once (Step S21), and issues the above-mentioned alarm related to the doors 3 and 4 (Step S22).

Then, the control unit waits until both the doors 3 and 4 are closed, on the basis of detection signals from the door sensors 101 and 102 (Step S23). When the doors 3 and 4 are all closed, the control unit resumes the process (Step S24).

When it is determined that the doors 3 and 4 are all closed (Step 20), the control unit determines the accommodation state of the drawer tray 70 on the basis of detection signals from the tray accommodation sensor 186 (Step S25). When it is determined that the drawer tray 70 is in an open state, the control unit stops the operation of the transfer arm 36 to discharge the medium M to the drawer tray 70 once (Step S26), and then issues the same alarm related to the drawer tray 70 as that in Step S4 to prompt the user to close the drawer tray 70 (Step S27).

After issuing the alarm, the control unit waits until the drawer tray 70 is closed on the basis of detection signals from the tray accommodation sensor 186 (Step S28). When the drawer tray 70 is closed, the control unit resumes the operation of the transfer arm 36 to discharge the medium M to the drawer tray 70 (Step S20).

When it is determined that the drawer tray 70 is closed (Step S25), the control unit determines whether the operation of the transfer arm 36 to discharge the medium M to the drawer tray 70 is completed (Step S30).

For example, when the transfer arm 36 transfers the printed medium M to the stacker portion 71 of the drawer tray 70 and then stops at the standby position, the control unit determines that the process is completed. When it is determined that the process is completed, the control unit ends the control operation for the medium M, and starts the control operation for the next medium M.

As described above, in the publisher 1 according to this embodiment, when the opening of the drawer tray 70 is detected while the transfer arm 36 discharges the medium to the drawer tray 70 during the process of the medium M, the process for the medium M stops. In the conditions other than when the transfer arm 36 discharges the medium to the drawer tray 70, even when the tray accommodation sensor 186 detects that the drawer tray 70 is opened, the control unit continuously performs the process for the medium M.

In addition, when the transfer arm 36 discharges the medium to the drawer tray 70 during the process of the medium M, the control unit issues an alarm to inform the user of the fact.

As described above, according to the publisher 1, which is an example of the media processing apparatus according to the above-described embodiment, when a medium M is accommodated in the stacker portion 71 inside the case 2, with the drawer tray 70 being accommodated in the accommodation portion, and then the drawer tray 70 is pulled out, the stacker portion 71 is positioned inside the case 2 of the publisher 1 when receiving the medium M. Therefore, a structure in which the medium M slides on an inclined plane to be discharged to the outside through an outlet is not needed, and thus it is possible to discharge the medium M without any damage. In addition, when receiving the medium M, the stacker portion 71 is positioned inside the case 2. Therefore, there are no restrictions in an installation position and the periphery thereof, unlike the structure in which a separate stacker is arranged in the outside. As a result, it is possible to improve flexibility in installation.

In addition, since the drawer tray 70 is provided out of the movement range of the doors 3 and 4, it is possible to take out the media M without opening the doors 3 and 4. Therefore, for example, when application software is used to set the destination of the media M to the stacker portion 71 of the drawer tray 70, it is possible to sequentially take out the processed media M without stopping a process.

Further, it is possible to take out the media M without opening the doors 3 and 4. Therefore, there is no fear that the operator touches the media M being processed with hands. As a result, it is possible to improve the process reliability of the media M.

According to the publisher 1, which is an example of the media processing apparatus, and a controlling method of the same, in the conditions other than when the transfer arm 36 discharges the medium to the drawer tray 70, even when the drawer tray 70 is opened during the process of the medium M, the control unit continuously performs processes on the medium M. Therefore, in the conditions other than when the transfer arm discharges a medium to the drawer tray 70, it is possible to take out the medium M from the drawer tray 70 while continuously performing processes. Specifically, during the process of the medium M, even when the user pulls out the drawer tray 70 to take out the processed medium M accommodated in the stacker portion 71 of the drawer tray 70, the process is continuously performed on the current medium M, in the conditions other than when the transfer arm 36 discharges the medium to the drawer tray 70. On the other hand, when the transfer arm 36 discharges the medium to the drawer tray 70 at the time when the drawer tray 70 is opened, the control unit stops the process for the current medium M, and waits until the drawer tray 70 is closed. Then, when the drawer tray 70 is closed, the control unit resumes the media discharge operation. That is, in the conditions other than when the transfer arm discharges the medium to the drawer tray 70, it is possible to sequentially take out the media M from the drawer tray 70 while performing the process.

Furthermore, when the transfer arm discharges a medium to the drawer tray 70, the control unit issues an alarm. Therefore, it is possible to warn the user to stop the opening of the drawer tray 70, in order to prevent the process from being stopped.

Further, the media used in the invention are not limited to the disk media, such as the media M according to the above-described embodiment, but the invention can be applied to polygonal media, such as rectangular media, or elliptical media. In addition, a data recording method is not particularly limited. For example, various recording methods, such as an optical recording method and a magneto-optical recording method, may be used as the data recording method.

What is claimed is:

1. A media processing apparatus comprising:
   a main body;
   a processor which is provided in the main body and configured to perform at least one of writing data on a plate-shaped medium, reading data from the medium and printing on the medium;
   a drawer tray provided in the main body, including a stacker portion which is configured to accommodate a plurality of plate-shaped media processed by the processor, and movable between an accommodated position where the stacker portion is capable of receiving the media and a drawn position where the drawer tray is pulled out from the main body to take out the media accommodated in the stacker portion;
   a tray accommodation sensor configured to detect whether the drawer tray is positioned at the accommodated position; and
   a control unit configured to stop a media discharge process of discharging the medium into the drawer tray when the tray accommodation sensor detects that the drawer tray is not positioned at the accommodated position.

2. The media processing apparatus as set forth in claim 1, wherein the main body is provided with an opening for exposing the processor to the outside and a door which is configured to open and close the opening; and
   wherein the drawer tray is movable between the accommodated position and the drawn position while the door is closed.

3. The media processing apparatus as set forth in claim 1, further comprising a warning unit configured to issue an alarm while performing the media discharge process such that a user does not move the drawer tray from the accommodated position.

4. The media processing apparatus as set forth in claim 1, wherein a movable area of the drawer tray is out of a movable area of the door.

5. A media processing apparatus comprising:
   a main body;
   a processor which is provided in the main body and configured to perform at least one of writing data on a plate-shaped medium, reading data from the medium and printing on the medium;
   a drawer tray provided in the main body, configured to accommodate a plurality of plate-shaped media processed by the processor, and movable between an accommodated position and a drawn position;
   a tray accommodation sensor configured to detect whether the drawer tray is positioned at the accommodated position; and a control unit configured to stop a media discharge operation of discharging the medium to the drawer tray when the tray accommodation sensor detects that the drawer tray is not positioned at the accommodated position at the time of starting the media discharge operation.

6. A controlling method of a media processing apparatus including a main body, a processor which is provided in the main body and configured to perform at least one of writing data on a plate-shaped medium, reading data from the medium and printing on the medium, a drawer tray provided in the main body, including a stacker portion which is configured to accommodate a plurality of plate-shaped media processed by the processor, and movable between an accommodated position where the stacker portion is capable of receiving the media and a drawn position where the drawer tray is pulled out from the main body to take out the media accommodated in the stacker portion, and a tray accommodation sensor configured to detect whether the drawer tray is positioned at the accommodated position, the controlling method comprising:
- performing the at least one of writing data on the medium, reading data from the medium and printing on the medium; and
- stopping a media discharge process of discharging the medium into the drawer tray when the tray accommodation sensor detects that the drawer tray is not positioned at the accommodated position.

7. The controlling method as set forth in claim 6, further comprising issuing an alarm while performing the media discharge process such that a user does not move the drawer tray from the accommodated position.

8. A controlling method of a media processing apparatus including a main body, a processor which is provided in the main body and configured to perform at least one of writing data on a plate-shaped medium, reading data from the medium and printing on the medium, a drawer tray provided in the main body, configured to accommodate a plurality of plate-shaped media processed by the processor, and movable between an accommodated position and a drawn position, and a tray accommodation sensor configured to detect whether the drawer tray is positioned at the accommodated position, the controlling method comprising:
- performing the at least one of writing data on the medium, reading data from the medium and printing on the medium; and
- stopping a media discharge operation of discharging the medium to the drawer tray when the tray accommodation sensor detects that the drawer tray is not positioned at the accommodated position at the time of starting the media discharge operation.

9. The controlling method as set forth in claim 8, further comprising issuing an alarm while performing the media discharge process such that a user does not move the drawer tray from the accommodated position.

* * * * *